(12) United States Patent
Elshafie et al.

(10) Patent No.: US 12,733,006 B2
(45) Date of Patent: Sep. 8, 2026

(54) COMMUNICATION STATE FOR WIRELESS COMMUNICATION DEVICE

(71) Applicant: QUALCOMM Incorporated, San Diego, CA (US)

(72) Inventors: Ahmed Elshafie, San Diego, CA (US); Seyedkianoush Hosseini, San Diego, CA (US); Ahmed Attia Abotabl, San Diego, CA (US); Krishna Kiran Mukkavilli, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 660 days.

(21) Appl. No.: 18/148,585

(22) Filed: Dec. 30, 2022

(65) Prior Publication Data

US 2024/0224285 A1 Jul. 4, 2024

(51) Int. Cl.

| | |
|---|---|
| ***H04W 72/23*** | (2023.01) |
| ***H04W 24/08*** | (2009.01) |
| ***H04W 72/02*** | (2009.01) |
| ***H04W 72/044*** | (2023.01) |

(52) U.S. Cl.

CPC ........... *H04W 72/23* (2023.01); *H04W 24/08* (2013.01); *H04W 72/02* (2013.01); *H04W 72/0473* (2013.01)

(58) Field of Classification Search

CPC ...... H04W 72/02; H04W 72/23; H04W 24/08
See application file for complete search history.

(56) References Cited

U.S. PATENT DOCUMENTS

| | | | | |
|---|---|---|---|---|
| 12,495,359 | B2 * | 12/2025 | Abotabl | H04W 52/0206 |
| 2016/0029379 | A1 * | 1/2016 | Kuchibhotla | H04W 4/90<br>370/329 |
| 2019/0357035 | A1 * | 11/2019 | Au | H04W 76/25 |
| 2020/0092685 | A1 * | 3/2020 | Fehrenbach | H04W 72/23 |
| 2022/0070779 | A1 * | 3/2022 | Li | H04W 76/14 |
| 2022/0338187 | A1 * | 10/2022 | Lu | H04W 72/20 |
| 2024/0107444 | A1 * | 3/2024 | Hu | H04W 76/28 |
| 2024/0205912 | A1 * | 6/2024 | Elshafie | H04W 72/40 |
| 2025/0071680 | A1 * | 2/2025 | Zhou | H04W 72/232 |

* cited by examiner

*Primary Examiner* — Charles C Jiang
*Assistant Examiner* — Ryan C Kavleski
(74) *Attorney, Agent, or Firm* — Dinsmore & Shohl LLP

(57) ABSTRACT

Various aspects of the present disclosure generally relate to wireless communication. In some aspects, a network entity may output a configuration of a communication state of a wireless communication device associated with the network entity, wherein the wireless communication device is associated with controlling one or more user equipments (UEs) for the network entity. The network entity may communicate in accordance with the configuration. Numerous other aspects are described.

30 Claims, 12 Drawing Sheets

Figure 7:
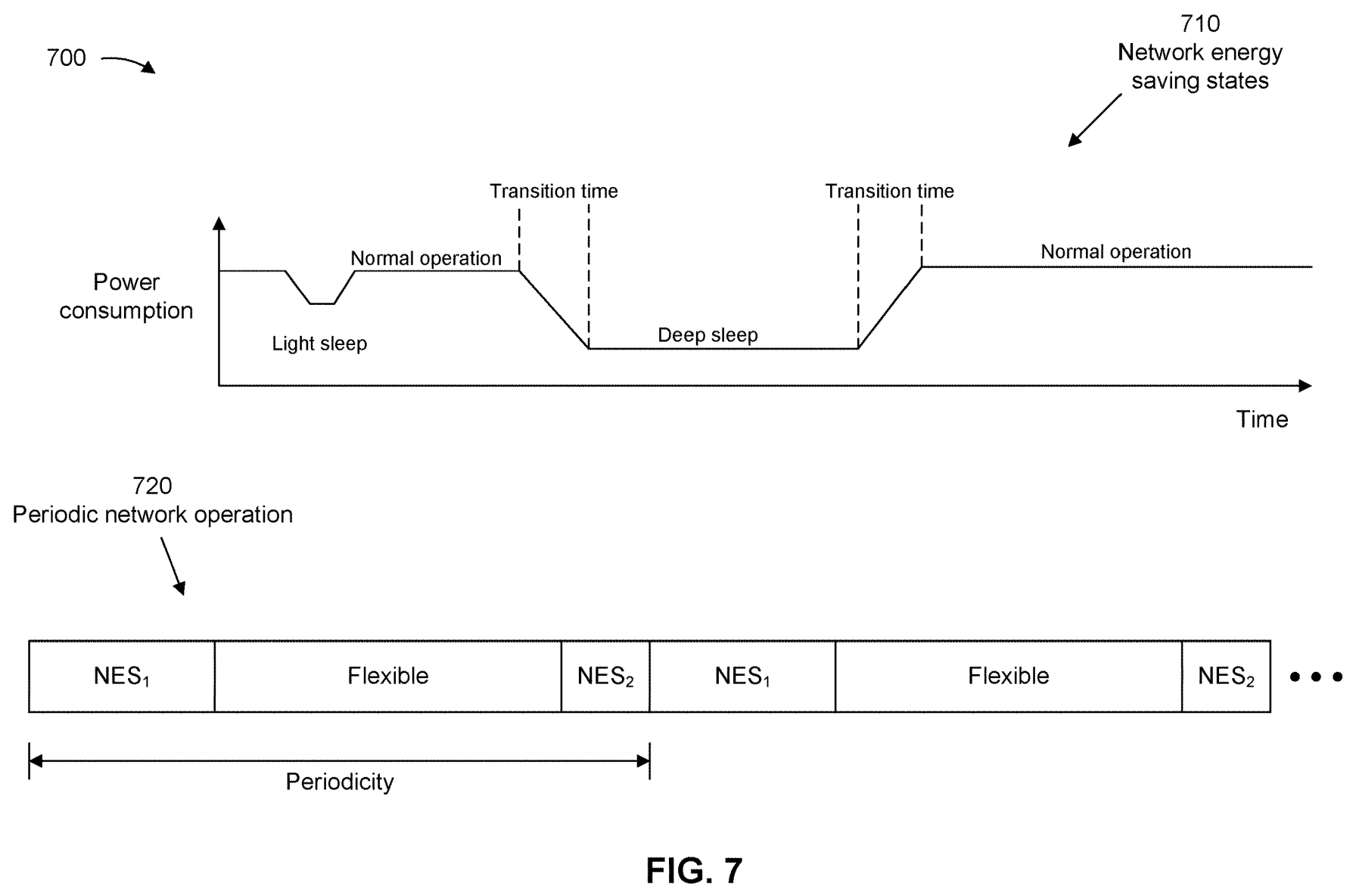

700

710
Network energy saving states

Power consumption

Time

Light sleep

Normal operation

Transition time

Deep sleep

Transition time

Normal operation

720
Periodic network operation $NES_1$

Flexible $NES_2$ $NES_1$

Flexible $NES_2$

Periodicity

COMMUNICATION STATE FOR WIRELESS COMMUNICATION DEVICE

FIELD OF THE DISCLOSURE

Aspects of the present disclosure generally relate to wireless communication and to techniques and apparatuses for communication state management for a wireless communication device.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a network entity. The method includes outputting a configuration of a communication state of a wireless communication device associated with the network entity, wherein the wireless communication device is associated with controlling one or more user equipments (UEs) for the network entity; and communicating in accordance with the configuration.

Another aspect provides a method for wireless communication by a wireless communication device. The method includes receiving, from a network entity, a configuration of a communication state of the wireless communication device, wherein the wireless communication device is associated with controlling one or more user equipments (UEs); and communicating with the network entity or the one or more UEs in accordance with the configuration.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of network operations to reduce energy consumption, in accordance with the present disclosure.

DETAILED DESCRIPTION

Figure 1:
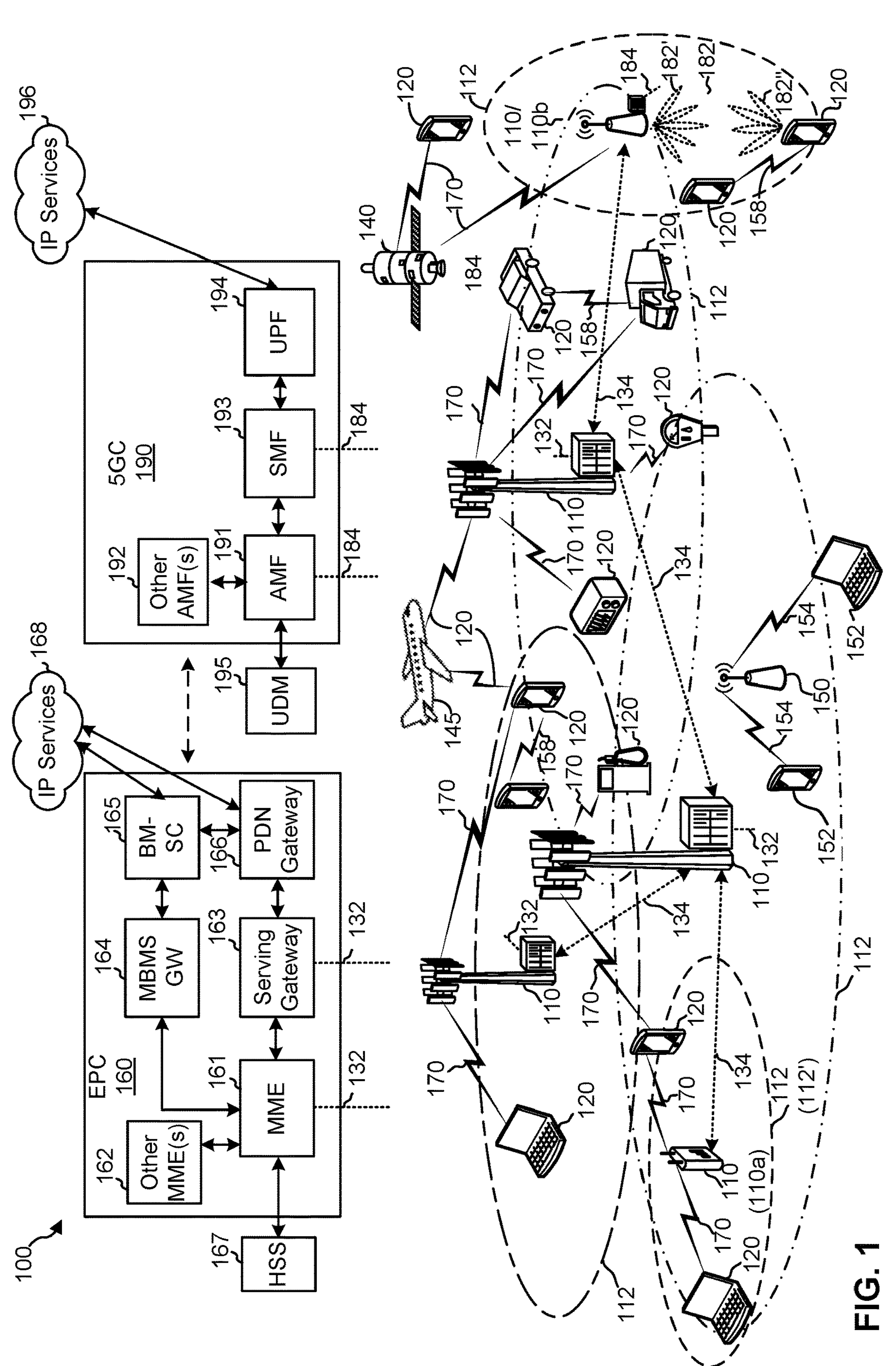
FIG. 1 depicts an example of a wireless communications network, in accordance with the present disclosure.

Aspects of the present disclosure provide apparatuses, methods, processing systems, and computer-readable mediums for communication state management for a wireless communication device.

A network entity of a wireless communications network, such as a gNB, may support various network energy saving (NES) states. An NES state may define operational parameters of at least the network entity such that a certain level of energy savings or performance can be realized. For example, in an NES state, the network entity may deactivate components, cease transmission of some signals, change a transmit power parameter, change a timing of transmissions, or the like. The network entity may enter different NES states based on traffic conditions, among other factors.

In some examples, a network entity may be associated with a wireless communication device that handles some functions of the network entity. For example, the wireless communication device may handle operations relating to management or scheduling of industrial Internet of Things (IIOT) devices, sidelink UEs, or the like. The wireless communication device may consume power in the course of performing such operations. Furthermore, operations of the wireless communication device may be affected by the NES state of the corresponding network entity. For example, in some NES states, the network entity may have diminished coverage, or may manage or schedule a reduced number of UEs. If performance of the wireless communication device is not adaptable, such as based on changing NES states of the corresponding network entity, then the wireless communication device may provide suboptimal coverage of UEs, use increased power, and degrade network operations.

Some techniques described herein provide a communication state (which may include an NES state) for a wireless communication device associated with a network entity. For example, the network entity may configure the communication state for a wireless communication device that is associated with controlling one or more UEs. The wireless communication device may communicate in accordance with the communication state, as described elsewhere herein. By configuring and using a communication state at the wireless communication device, coverage of UEs controlled by the wireless communication device is improved, network power usage may be reduced, and network operations are improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IOT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, various functions of a base station (such as functions related to a sidelink deployment or an Industrial Internet of Things deployment) may be handled by a wireless communication device such as a programmable logic controller (PLC), a primary UE (e.g., of a sidelink deployment), a controlling UE, or a controlling unit of a sidelink. The wireless communication device may be co-located with the base station, or may be separate from the base station.

Figure 3:
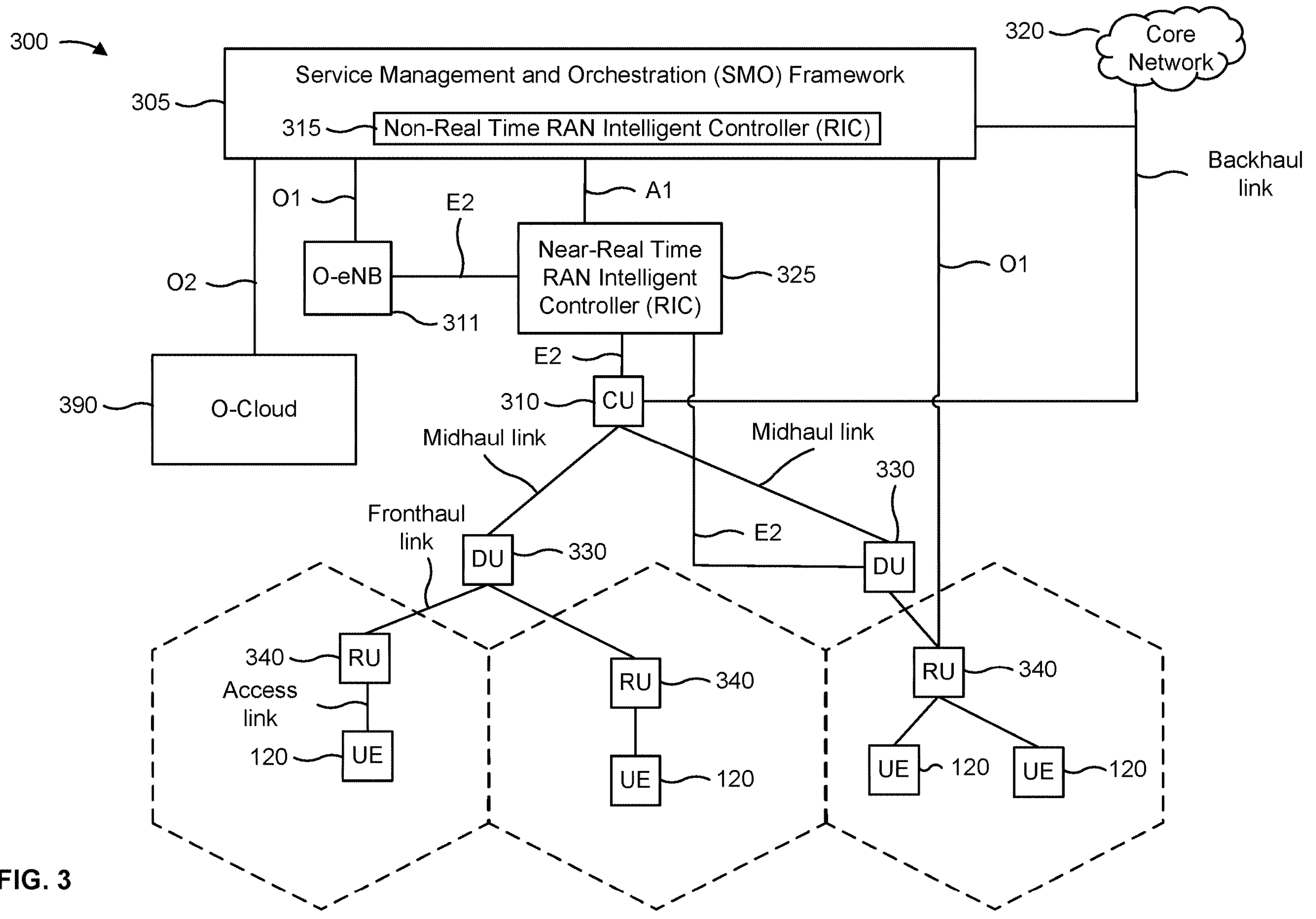
FIG. 3 depicts an example disaggregated base station architecture.

In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHZ, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
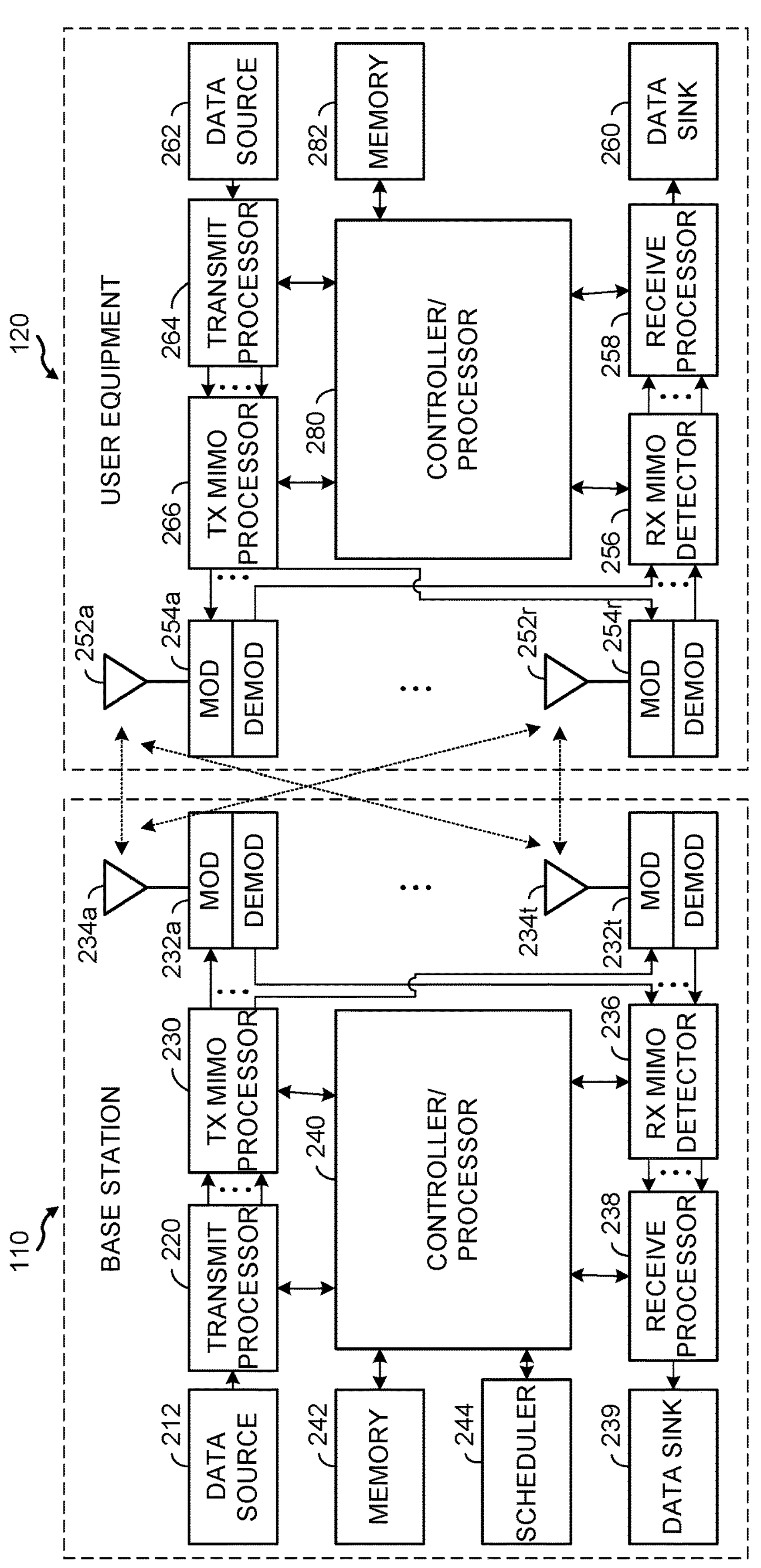
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, "receiving" may refer to various mechanisms of obtaining data, such as obtaining data from antennas 234*a-t*, transceivers 232*a-t*, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, "receiving" may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figures 4A, 4B, 4C, 4D:
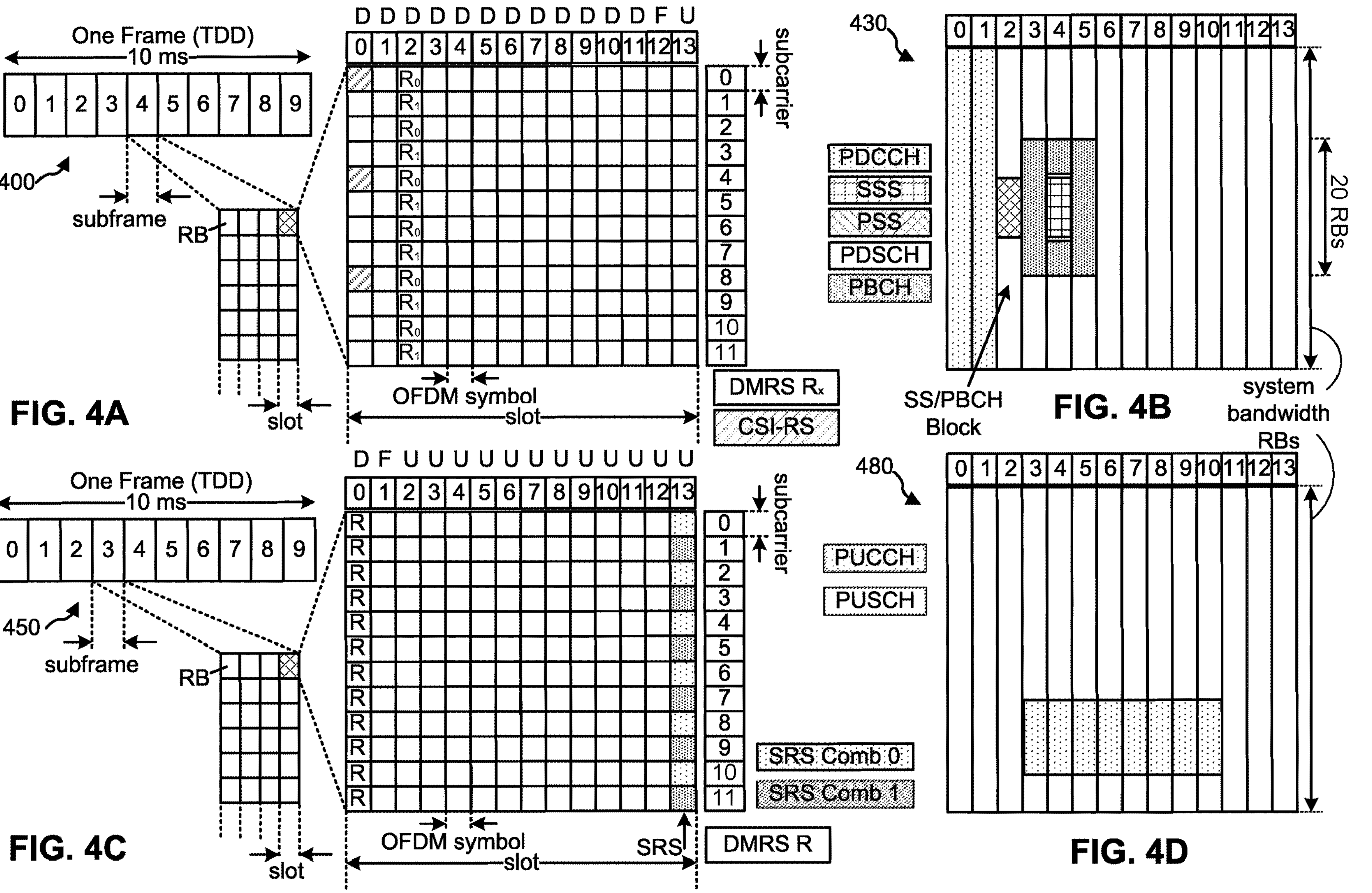
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^{\mu}$ slots/subframe. The subcarrier spacing and symbol length/duration are a function of the numerology. The subcarrier spacing may be equal to $2^{\mu}\times 15$ kHz, where u is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
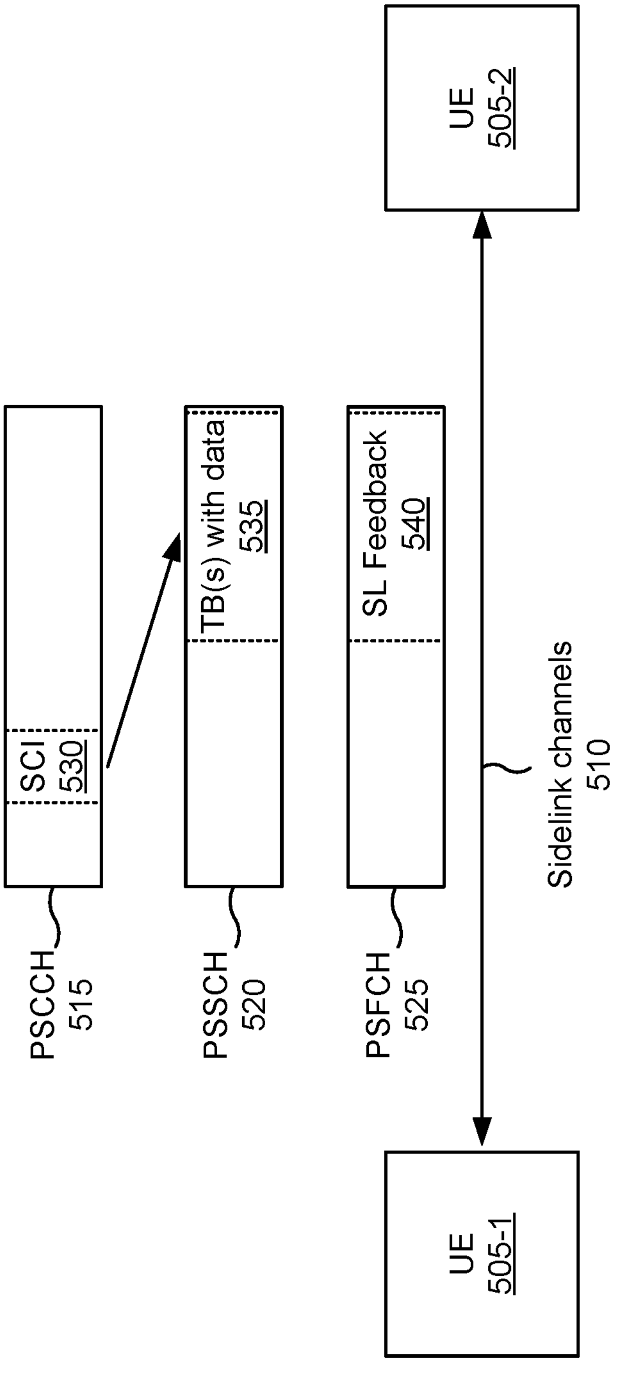
FIG. 5 is a diagram illustrating an example of sidelink communications, in accordance with the present disclosure.

FIG. 5 is a diagram illustrating an example 500 of sidelink communications, in accordance with the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for peer-to-peer (P2P) communications, device-to-device (D2D) communications, vehicle-to-anything (V2X) communications (e.g., which may include vehicle-to-vehicle (V2V) communications, vehicle-to-infrastructure (V2I) communications, and/or vehicle-to-pedestrian (V2P) communications) and/or mesh networking. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, or symbols) using global navigation satellite system (GNSS) timing.

As further shown in FIG. 5, the one or more sidelink channels 510 may include a PSCCH 515, a PSSCH 520, and/or a PSFCH 525. The PSCCH 515 may be used to communicate control information, similar to a PDCCH and/or a PUCCH used for cellular communications with a base station 110 via an access link or an access channel. The PSSCH 520 may be used to communicate data, similar to a PDSCH and/or a PUSCH used for cellular communications with a base station 110 via an access link or an access channel. For example, the PSCCH 515 may carry sidelink control information (SCI) 530, which may indicate various control information used for sidelink communications, such as one or more resources (e.g., time resources, frequency resources, and/or spatial resources) where a transport block (TB) 535 may be carried on the PSSCH 520. The TB 535 may include data. The PSFCH 525 may be used to communicate sidelink feedback 540, such as HARQ feedback (e.g., acknowledgement or negative acknowledgement (ACK/NACK) information), transmit power control (TPC), and/or a scheduling request (SR).

Although shown on the PSCCH 515, in some aspects, the SCI 530 may include multiple communications in different stages, such as a first stage SCI (SCI-1) and a second stage SCI (SCI-2). The SCI-1 may be transmitted on the PSCCH 515. The SCI-2 may be transmitted on the PSSCH 520. The SCI-1 may include, for example, an indication of one or more resources (e.g., time resources, frequency resources, and/or spatial resources) on the PSSCH 520, information for decoding sidelink communications on the PSSCH, a QoS priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 520, such as a HARQ process ID, a new data indicator (NDI), a source identifier, a destination identifier, and/or a channel state information (CSI) report trigger.

In some aspects, the one or more sidelink channels 510 may use resource pools. For example, a scheduling assignment (e.g., included in SCI 530) may be transmitted in sub-channels using specific RBs across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a sidelink transmission mode (e.g., Mode 1) where resource selection and/or scheduling is performed by a base station 110 (e.g., a base station, a CU, or a DU). For example, the UE 505 may receive a grant (e.g., in DCI or in an RRC message, such as for configured grants) from the base station 110 (e.g., directly or via one or more network nodes) for sidelink channel access and/or scheduling. In some aspects, a UE 505 may operate using a transmission mode (e.g., Mode 2) where resource selection and/or scheduling is performed by the UE 505 (e.g., rather than a base station 110). In some aspects, the UE 505 may perform resource selection and/or scheduling by sensing channel availability for transmissions. For example, the UE 505 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources and/or channel parameters. Additionally, or alternatively, the UE 505 may perform resource selection and/or scheduling by determining a channel busy ratio (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, and/or an MCS to be used for the upcoming sidelink transmission. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

In some examples, a wireless communication device, such as a programmable logic controller (PLC) or a UE (e.g., UE 120, UE 505), may control a set of UEs, such as industrial Internet of Things (IIoT) UEs or sidelink UEs (e.g., UEs 505) communicating on a sidelink. The wireless communication device may communicate with the set of UEs and with a network entity (e.g., a BS 110). Techniques described herein provide a communication state for a wireless communication device, which may include, for example, an energy state of the wireless communication device, a joint energy state of the wireless communication device and the network entity, or the like.

As indicated above, FIG. 5 is provided as an example. Other examples may differ from what is described with respect to FIG. 5.

Figure 6:
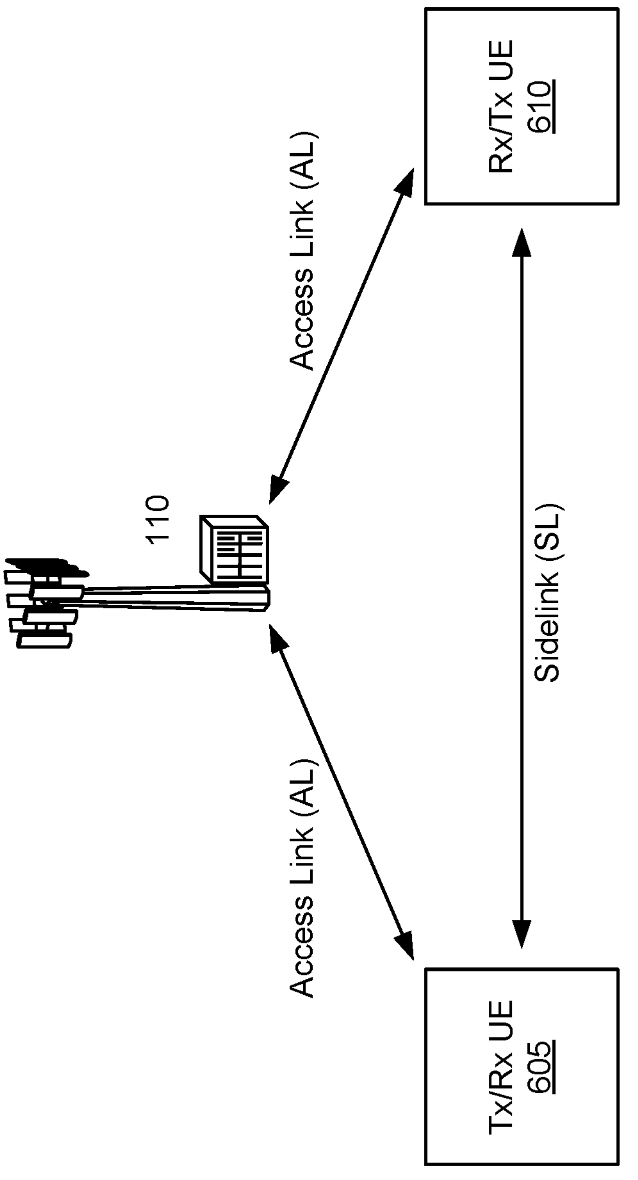
FIG. 6 is a diagram illustrating an example of sidelink communications and access link communications, in accordance with the present disclosure.

FIG. 6 is a diagram illustrating an example 600 of sidelink communications and access link communications, in accordance with the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a base station 110 may communicate with the Tx/Rx UE 605 (e.g., directly or via one or more network entities, such as a wireless communication device), such as via a first access link. Additionally, or alternatively, in some sidelink modes, the base station 110 may communicate with the Rx/Tx UE 610 (e.g., directly or via one or more network entities such as a wireless communication device), such as via a first access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink (e.g., between UEs or between a UE and a wireless communication device), and access link communications may be transmitted via the access link. An access link communication may be either a downlink communication (from a base station 110 to a UE 120) or an uplink communication (from a UE 120 to a base station 110).

As indicated above, FIG. 6 is provided as an example. Other examples may differ from what is described with respect to FIG. 6.

FIG. 7 is a diagram illustrating an example 700 of network operations to reduce energy consumption, in accordance with the present disclosure. Network energy saving and/or network energy efficiency measures are expected to have increased importance in wireless network operations for various reasons, including climate change mitigation, environmental sustainability, and network cost reduction. For example, although NR generally offers a significant energy efficiency improvement per gigabyte over previous generations (for example, LTE), new NR use cases that demand high data rates and/or the adoption of millimeter wave frequencies may require more network sites, greater network density, more network antennas, larger bandwidths, and/or more frequency bands, which could potentially lead to a more efficient wireless network that nonetheless has higher energy requirements and/or causes more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). Most energy consumption and/or energy costs come from powering a RAN, which accounts for about half of the energy consumed by a wireless network. Accordingly, measures to increase network energy savings and/or network energy efficiency are important factors that may drive adoption and/or expansion of wireless networks.

One way to increase energy efficiency in a RAN may be to adapt network energy consumption models to achieve more efficient operation dynamically and/or semi-statically. For example, power consumption in a RAN can generally be split into a dynamic portion, in which power is consumed only when data transmission and/or reception is ongoing, and a static portion, in which power is consumed all of the time to maintain the operation of radio access devices even when data transmission and/or reception is not ongoing. Accordingly, one potential approach to improve network energy savings may be to adapt power consumption models from the network perspective by reducing relative energy consumption for downlink and/or uplink communication (for example, considering factors such as power amplifier (PA) efficiency, quantities of transceiver units (TxRUs), and/or network load, among other examples), enabling network sleep states and associated transition times, and/or defining appropriate reference parameters and/or configurations. For example, in some cases, different NES states may be configured to enable granular adaptation of transmission and/or reception to reduce energy consumption using techniques in time, frequency, spatial, and/or power domains, with potential support and/or feedback from UEs and/or potential UE assistance information. However, network devices and UEs may need to exchange and/or coordinate information over network interfaces to control configurations, communication parameters, and/or UE behavior for each NES state, which can increase configuration complexity and/or signaling overhead. This may pose challenges because techniques to reduce network energy consumption should generally be designed to avoid having a large impact on key performance indicators (KPIs) related to network and/or UE performance (for example, spectral efficiency, latency, UE power consumption, and/or complexity, among other examples).

Accordingly, as shown in FIG. 7, a network entity may be configured to operate in different NES states 710 over time, where each NES state 710 may use one or more techniques to adapt transmission and/or reception in time, frequency, spatial, and/or power domains. An NES state may be referred to herein as an energy state. A wireless communication device (e.g., a PLC or a transmitting UE) can also use an NES state, which may adapt transmission and/or reception of the wireless communication device in time, frequency, spatial, and/or power domains. For example, as shown in FIG. 7, the NES states 710 of the network entity may include a normal operation mode (which may also be referred to as a legacy mode, a default mode, or a baseline mode) and one or more sleep modes that may be associated with a lower power consumption than the normal operation mode. In general, a network node may transition between different NES states 710 to save power and maintain network operation (for example, minimizing impact on KPIs such as spectral efficiency, capacity, user perceived throughput (UPT), latency, UE power consumption, complexity, handover performance, call drop rate, initial access performance, and/or service level agreement assurance). Furthermore, the network node may transition between different sleep modes based on traffic demands (for example, entering a light sleep mode when traffic demands are slightly lower than usual and/or entering a deep sleep mode when traffic demands are much lower than usual), and different sleep modes may be associated with different energy saving techniques (for example, one or more antenna panels, antenna ports, and/or RF chains may be turned off in the deep sleep mode but remain on in the light sleep mode). Accordingly, as shown in FIG. 7, the normal operation mode and the different sleep modes may vary in terms of power consumption and may be associated with different transition times (for example, a transition time to or from the deep sleep mode may be longer than a transition time to or from the light sleep mode).

In some cases, as described herein, an NES state 710 may generally correspond to a particular set of configurations, communication parameters, and/or UE behaviors. For example, an NES state 710 may include a set of configurations, communication parameters, and/or UE behaviors associated with one or more energy saving techniques that are implemented in the time, frequency, spatial, and/or power domain to reduce energy consumption. For example, a network node may be configured to not transmit an SSB to reduce energy consumption in a first NES state 710 (for example, an SSB-less NES state 710), and may be configured to employ other energy saving techniques such as turning off one or more antenna panels in a second NES state 710. Furthermore, in some cases, an NES state 710 may be associated with a set of configurations, communication parameters, and/or UE behaviors associated with the normal or legacy mode of network operation. Accordingly, because one design objective in energy-efficient wireless networks is to achieve more efficient operation dynamically and/or semi-statically, a network node may configure a semi-static pattern 720 to achieve network energy savings. For example, as shown in FIG. 7, the semi-static pattern 720 (for example, configured via RRC signaling) may include a sequence of NES states 710 that the network node follows in accordance with a given periodicity (for example, in FIG. 7, the network node operates in accordance with a first NES state, shown as $NES_1$, for a first time period, then operates in a flexible mode for a second time period, then operates in accordance with a second NES state, shown as $NES_2$, for a third time period, and the pattern then repeats). In cases where the semi-static pattern 720 includes a flexible mode, the network node may operate in accordance with any suitable NES state during the time period corresponding to the flexible mode (for example, depending on current traffic conditions), and the NES state that the network node selects for the time period corresponding to the flexible mode may be dynamically indicated to served UEs.

As indicated above, FIG. 7 is provided as an example. Other examples may differ from what is described with regard to FIG. 7.

Figure 8:
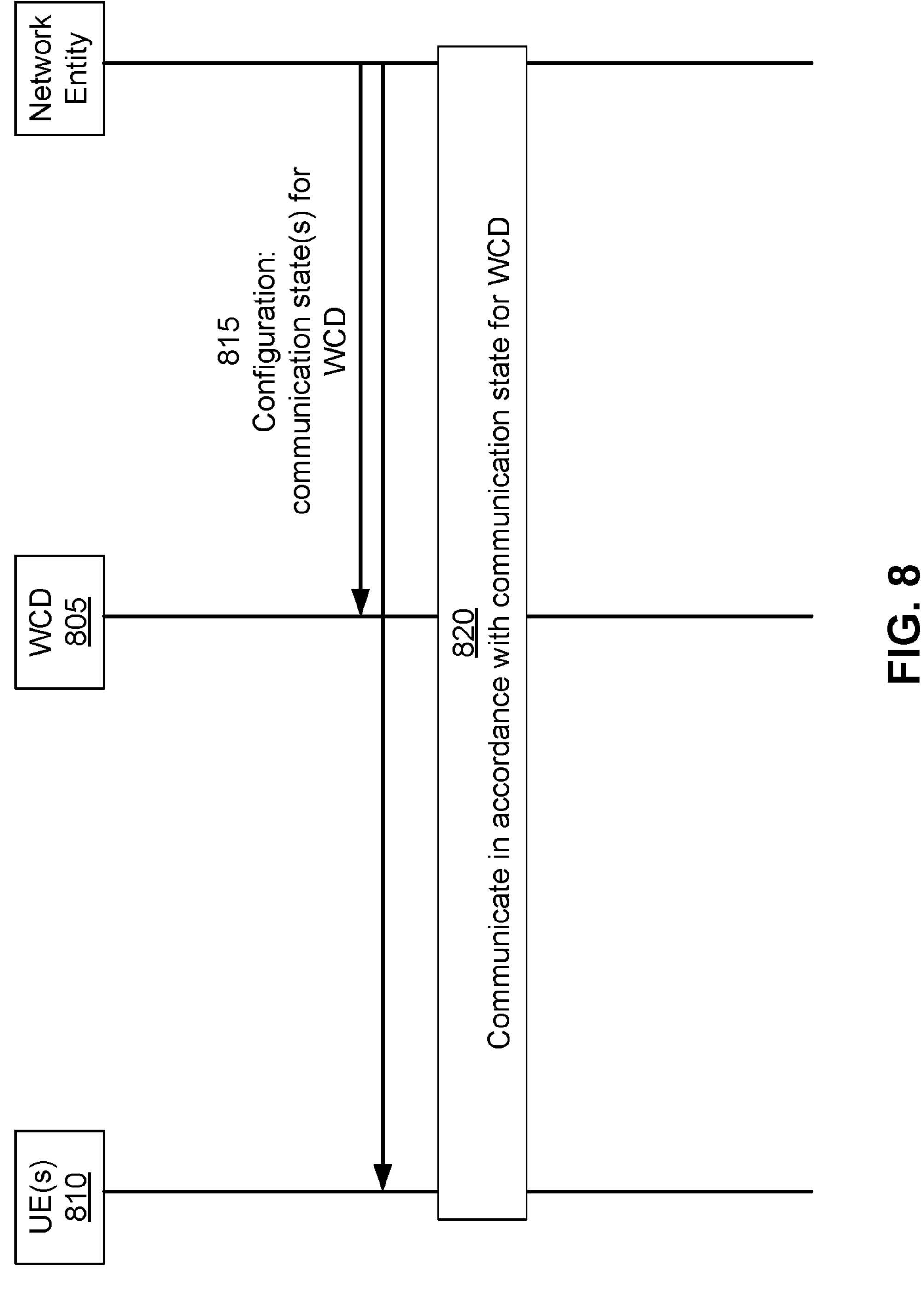
FIG. 8 is a diagram illustrating an example environment including a network entity, a wireless communication device, and a set of UEs.

FIG. 8 is a diagram illustrating an example environment 800 including a network entity (e.g., network entity 110), a wireless communication device (WCD) 805, and a set of (one or more) UEs 810 (e.g., UE 120, UE 505, UE 605, a sensor, an actuator). WCD 805 may include a controller (e.g., a PLC), a primary UE, a controlling UE, or a primary unit of a sidelink deployment. In some aspects, WCD 805 may be associated with controlling the set of UEs 810. For example, WCD 805 may control the set of UEs 810 in an IIOT deployment (in which the set of UEs 810 may include IIoT devices such as sensors or actuators) or a sidelink deployment (in which the set of UEs 810 may include UEs communicating on a sidelink). WCD 805 may be associated with the network entity. For example, WCD 805 may be configured by the network entity, may be managed by the network entity, or may be associated with a coverage area managed by the network entity.

As shown by reference number 815, the network entity may output (e.g., transmit or cause another device to transmit) a configuration of a communication state for WCD 805. In some aspects, the configuration may include a set of parameters that define the communication state. In some other aspects, the configuration may indicate a communication state (e.g., may point to a communication state that has previously been configured). In some aspects, the network entity may output at least part of the configuration to WCD 805, and WCD 805 may receive the configuration. Additionally, or alternatively, the network entity may output at least part of the configuration to the set of UEs 810 (e.g., directly, via the WCD 805, or via another device). The network entity may provide the configuration via RRC signaling, medium access control signaling, downlink control information, or a combination thereof.

The communication state may be based at least in part on an energy state of at least the WCD 805. For example, the communication state may include the energy state (and, optionally, other parameters that define behavior of the WCD 805). As another example, the communication state may include or be derived from the energy state of the WCD 805 and an energy state of the network entity. References to "the energy state" in the description of FIG. 8 should be understood to refer to the energy state of the WCD 805 unless explicitly indicated otherwise.

In some aspects, the communication state may include an energy state (e.g., an NES state) for the WCD 805. An energy state for a WCD 805 may generally correspond to a particular set of configurations, communication parameters, and/or UE behaviors. For example, an energy state may include a set of configurations, communication parameters, and/or UE behaviors associated with one or more energy saving techniques that are implemented in the time, frequency, spatial, and/or power domain to reduce energy consumption. For example, a WCD 805 may be configured to not transmit an SSB to reduce energy consumption in a first energy state (for example, an SSB-less energy state), and may be configured to employ other energy saving techniques such as turning off one or more antenna panels in a second energy state. Furthermore, in some cases, an energy state may be associated with a set of configurations, communication parameters, and/or UE behaviors associated with the normal or legacy mode of network operation.

The communication states (e.g., energy states, NES states) of the WCD 805 may include a normal operation mode (which may also be referred to as a legacy mode or a default mode) and one or more sleep modes that may be associated with a lower power consumption than the normal operation mode. Additionally, or alternatively, the communication states may include a mode in which the WCD 805 performs scheduling for the set of UEs 810. A communication state that indicates that the corresponding device (e.g., WCD 805 or the network entity) is to perform scheduling may be referred to as "associated with scheduling of the set of UEs," and a communication state that indicates that the corresponding device is not to perform scheduling may be referred to as "not associated with scheduling of the set of UEs." In general, a WCD 805 may transition between different communication states to save power and maintain network operation (for example, minimizing impact on KPIs such as spectral efficiency, capacity, user perceived throughput (UPT), latency, UE power consumption, complexity, handover performance, call drop rate, initial access performance, and/or service level agreement assurance), or to handle certain operations of the network entity (e.g., scheduling) while the network entity is in a particular NES state. Furthermore, the WCD 805 may transition between different sleep modes based on traffic demands or signaling from a network entity (for example, entering a light sleep mode when traffic demands are slightly lower than usual and/or entering a deep sleep mode when traffic demands are much lower than usual), and different sleep modes may be associated with different energy saving techniques (for example, one or more antenna panels, antenna ports, and/or RF chains may be turned off in the deep sleep mode but remain on in the light sleep mode). Accordingly, the normal operation mode and the different sleep modes may vary in terms of power consumption and may be associated with different transition times (for example, a transition time to or from the deep sleep mode may be longer than a transition time to or from the light sleep mode).

In some aspects, the network entity may configure a semi-static pattern for the communication state of the WCD 805. For example, similar to what is shown in FIG. 7, the semi-static pattern (for example, configured via RRC signaling) may include a sequence of communication states that the WCD 805 follows in accordance with a given periodicity. In cases where the semi-static pattern includes a flexible mode, the WCD 805 may operate in accordance with any suitable communication state during the time period corresponding to the flexible mode (for example, depending on current traffic conditions), and the communication state that the WCD 805 (or the network entity) selects for the time period corresponding to the flexible mode may be dynamically indicated to the WCD 805 and/or to the set of UEs 810. In some aspects, the network entity may output information indicating the semi-static pattern to the set of UEs 810, such as via RRC signaling between the WCD 805 and the set of UEs 180, or as part of a resource pool configuration. Thus, a pattern of sleeping or communication states can be indicated to all UEs through RRC signaling between the WCD 805 and the UEs, or as part of a resource pool in which the network entity may indicate the energy state of each PLC and the pattern of each PLC.

In some aspects, the network entity may indicate a communication state dynamically. For example, the network entity may output an indication to activate a communication state for the WCD 805, and the WCD 805 may activate the communication state upon receiving the signaling. In some aspects, the indication may explicitly identify the communication state (e.g., a set of parameters of the communication state, such as a number of antennas, an action to be performed, a transmit power, or the like). In some aspects, the indication may point to a configured communication state, such as a communication state configured via RRC signaling or defined in a wireless communication specification. In some aspects, the indication may indicate a communication state of the network entity, and the WCD 805 may activate the communication state of the WCD 805 based at least in part on an association with the communication state of the network entity. For example, if the network entity is in a low power energy state (e.g., a deep sleep), the WCD 805 may activate a communication state in which the PLC schedules the set of UEs 810.

In some aspects, the network entity may indicate a communication state semi-dynamically. For example, the network entity may update the communication state in accordance with a periodicity. As another example, the configuration of the communication state may apply for a defined length of time or when a particular condition is met.

In some aspects, the network entity may operate in a communication state, such as an energy state (e.g., NES state 710). The energy state of the network entity and an energy state of the WCD 805 may be collectively referred to as a combined energy state or a joint energy state.

In some aspects, the configuration may be included in a resource pool configuration (e.g., for a sidelink resource pool). For example, the network entity may configure a resource pool across multiple devices (e.g., the WCD 805 and the set of UEs 810). The resource pool configuration may indicate one or more communication states (e.g., energy states, NES states) for the WCD 805. When communicating on the resource pool, the WCD 805 may use the one or more communication states (e.g., a communication state selected from the one or more communication states). When communicating on a different resource pool (e.g., a resource pool that does not include a configuration of a communication state), the WCD 805 may communicate using a baseline communication state, such as a legacy communication state.

In some aspects, the configuration may include a first configuration for the WCD 805 (e.g., indicating an energy state) and a communication configuration for a UE of the set of UEs 810. The communication configuration may indicate one or more parameters that are associated with the communication state indicated by the first configuration. For example, when the WCD 805 is in the communication state, the UE may use the one or more parameters indicated by the communication configuration as associated with the communication state. In some aspects, the one or more parameters may include a transmit power of the UE (e.g., a power control parameter). For example, the UE may increase a transmit power when the communication state is associated with a reduced number of receive antennas or receive chains (e.g., RXIUs) at the WCD 805. As another example, the UE may decrease a transmit power (or use a baseline transmit power) when the communication state is associated with a baseline (e.g., legacy) operation at the WCD 805. In some aspects, the one or more parameters may include a relaying configuration. For example, the one or more parameters may indicate for the UE to act as a relay UE for other UEs of the set of UEs 810 when the WCD 805 is in a communication state. In some aspects, the one or more parameters may indicate a number of receive antennas (or receive chains) of the UE. For example, the UE may use an increased number of receive antennas (or receive chains) when the WCD 805 is in a communication state. In some aspects, the communication configuration may be based at least in part on a joint energy state of the network entity and the WCD 805, as described below.

In some aspects, the WCD 805 may communicate with the network entity in accordance with a communication configuration. For example, the WCD 805 may communicate with the network entity or a UE of the set of UEs 810 in accordance with a first communication configuration, and a UE of the set of UEs 810 may communicate with the WCD 805 and/or the network entity using a second communication configuration. In some aspects, the first communication configuration may indicate a delta modulation and coding scheme (MCS), which is a value indicating an adjustment to an MCS index to be used when communicating in a particular energy state (e.g., a delta MCS of "−4" may indicate to modify an indicated MCS from 28 to 24). In some aspects, the first communication configuration may indicate an MCS to be used when communicating in accordance with a particular communication state. In some aspects, the first communication configuration may indicate a block error rate (BLER) threshold, which indicates an acceptable BLER for communications while the WCD 805 is in a particular communication state. In some aspects, the first communication configuration may indicate a service to be served or one or more logical channel groups (LCGs) to be served while the WCD 805 is in a particular communication state. "Serving a service" may include activating the service, triggering activation of the service, or communicating in association with the service. "Serving an LCG" may include transmitting or receiving traffic of the LCG. In some aspects, the second communication configuration may indicate a transmit power parameter, a bandwidth part (e.g., a bandwidth part on which the UE is to communicate), a resource allocation limit, or the like.

In some aspects, the first communication configuration and/or the second communication configuration may be based at least in part on a joint energy state of the WCD 805 and the network entity. For example, the communication state of the WCD 805 may include the joint energy state, and the communication configuration may be based at least in part on the communication state. If the UE communicates with both the network entity and the WCD 805, one or more parameters of the second communication configuration may be based at least in part on the joint energy state (e.g., the second communication configuration may indicate one or more parameters for transmission or reception at the UE when a particular joint energy state is active). As another example, the first communication configuration may indicate a search space set group (SSSG) for transmissions from the network entity to the WCD 805 in a particular joint energy state, a DCI monitoring occasion for transmissions from the network entity to the WCD 805 in a particular joint energy state, or the like.

In some aspects, the communication state of the WCD 805 (or the joint energy state of the WCD 805 and the network entity) is associated with a discontinuous reception (DRX) configuration between the PLC and a UE of the set of UEs 810. A DRX configuration provides for a receiver to periodically enter a low power state, such as by ceasing monitoring or reception of communications. The receiver may periodically awaken to receive communications or to monitor for communications directed to the receiver. A DRX configuration may be configured for a given energy state or joint energy state, such as to align transmissions of the WCD 805 with the DRX configuration of the corresponding UE.

In some aspects, the communication state of the WCD 805 (or the joint energy state of the WCD 805 and the network entity) is associated with a power control parameter of a UE of the set of UEs 810 or of the WCD 805. For example, the UE or the WCD 805 may be configured with a power control parameter that is mapped to a given communication state or joint energy state. In some aspects, the power control parameter may indicate to increase a transmit power when a receiver (e.g., the WCD 805 or the network entity) is in an energy state or a joint energy state associated with a diminished reception capability.

In some aspects, the communication state of the WCD 805 (or the joint energy state of the WCD 805 and the network entity) is associated with a CSI configuration or a DMRS configuration. For example, a given communication state or joint energy state may be mapped to a particular CSI configuration or a particular DMRS configuration. A CSI configuration may indicate one or more parameters for transmission or reception of CSI, such as a resource allocation, a periodicity, a number of ports for transmission or reception, a beam index, or the like. A DMRS configuration may indicate one or more parameters for transmission or reception of a DMRS, such as a location of the DMRS, a transmission comb, a density of the DMRS, or the like.

In some aspects, the communication state of the WCD 805 (or the joint energy state of the WCD 805 and the network entity) is associated with an expected duration between resource allocations. For example, the communication state may be associated with an expected duration between two consecutive allocations (such as a first transmit resource allocation and a second transmit resource allocation, a first transmit resource allocation and a second receive resource allocation, a first receive resource allocation and a second receive resource allocation, or a first receive resource allocation and a second transmit resource allocation). The resource allocations can be associated with a configured grant, a dynamic grant, or a combination thereof. Thus, consecutive allocations can be placed farther apart for a communication state associated with infrequent communication or closer together for a communication state associated with frequent communication.

In some aspects, the communication state of the WCD 805 (or the joint energy state of the WCD 805 and the network entity) is associated with a configured grant configuration. For example, one or more parameters of a configured grant configuration (such as a configured grant configuration for transmission or a configured grant configuration for reception), such as a periodicity, a number of repetitions, or a resource allocation, may be mapped to a particular communication state or a particular joint energy state.

In some aspects, the communication state of the WCD 805 (or the joint energy state of the WCD 805 and the network entity) is associated with a scheduling request configuration. For example, a particular scheduling request configuration (e.g., indicating a physical uplink control channel resource, an identifier, a periodicity, an offset, a prohibit timer, a maximum number of transmissions, or the like) may be mapped to a particular communication state or joint energy state.

In some aspects, the communication state of the WCD 805 (or the joint energy state of the WCD 805 and the network entity) is associated with a buffer status report (BSR) configuration. For example, a particular BSR configuration (e.g., indicating a periodic BSR timer, a retransmission BSR timer, or a logical channel scheduling request delay timer, among other examples) may be mapped to a particular communication state or joint energy state.

In some aspects, a particular transmission cast type may be enabled or disabled depending on a communication state of the WCD 805 (or a joint energy state). For example, the transmission cast type may include groupcast (in which a transmission is directed to a defined group of recipients such as UEs associated with a group identifier), broadcast (in which a transmission is directed to all recipients or all recipients within a particular range), or unicast (in which a transmission is directed to a particular recipient such as a particular UE). The configuration of the communication state may indicate, for a particular communication state, whether a transmission cast type is enabled or disabled. For example, the configuration may indicate that groupcast transmission is disabled for a particular communication state, such that UEs do not expect a certain transmission cast type in a certain communication state.

In some aspects, a non-data sidelink service may be enabled or disabled in a particular communication state. For example, the non-data sidelink service may include a sidelink positioning service, a sidelink sensing service, or another form of non-data service. The configuration of the communication state may indicate, for a particular communication state, whether the non-data sidelink service is enabled or disabled.

In some aspects, a communication state is associated with a maximum number of retransmissions. For example, in some deployments, a given transport block can be retransmitted up to a maximum number of times (e.g., 2 times). The configuration of the communication state may indicate a maximum number of repetitions usable in the energy state. For example, the communication state may be associated with an increased maximum number of repetitions if the communication state is associated with a lower transmit power or a diminished reception capability. As another example, the communication state may be associated with a decreased maximum number of repetitions (or disabled repetition) if the communication state is associated with a higher transmit power or an increased reception capability. In some aspects, the network entity may output a dynamic indication of the maximum number of repetitions (e.g., via DCI). In some aspects, the network entity may output an indication of the maximum number of repetitions via Layer 1 signaling (e.g., DCI or a reference signal). In some aspects, the network entity may output an indication of the maximum number of repetitions via Layer 2 signaling (e.g., MAC signaling). In some aspects, the network entity may output an indication of the maximum number of repetitions via Layer 3 signaling (e.g., RRC signaling). In some aspects, a communication state may be associated with multiple maximum numbers of repetitions, and the network entity may output an indication of a selected maximum number of repetitions of the multiple maximum numbers of repetitions.

As shown by reference number 820, the network entity, the set of UEs 810, and the WCD 805 may communicate in accordance with the communication state. For example, the WCD 805 may transmit or receive communications using parameters indicated by the communication state. As another example, the WCD 805 may enable or disable certain functions (e.g., a transmission cast type, a non-data sidelink service, repetition, or another function described in connection with reference number 815) according to the communication state and/or the configuration of the communication state. The set of UEs 810 may transmit or receive communications in accordance with a communication configuration (e.g., the second communication configuration described above) which may be based at least in part on the communication state. For example, the second communication configuration may define particular parameters for communication of the set of UEs 810 when a particular communication state is active.

As indicated above, FIG. 8 is provided as an example. Other examples may differ from what is described with regard to FIG. 8.

Figure 9:
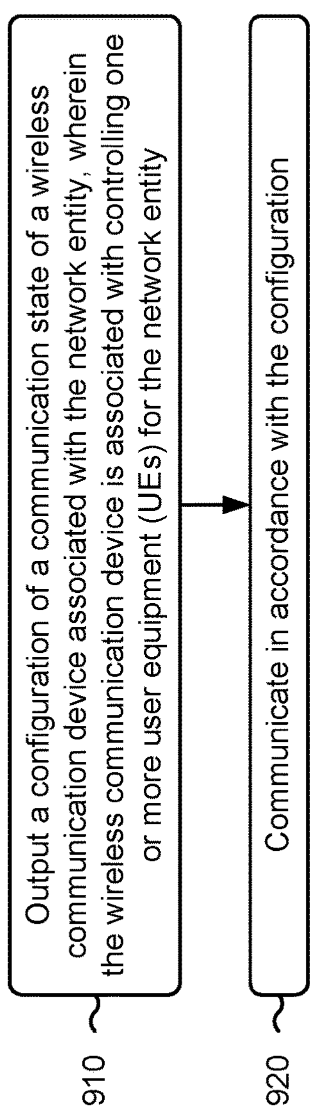
FIG. 9 shows a method for wireless communications by a network entity.
Figure 9:

FIG. 9 shows a method 900 for wireless communications by a network entity, such as BS 110, or a disaggregated base station as discussed with respect to FIG. 3.

Method 900 begins at 910 with outputting a configuration of a communication state of a wireless communication device associated with the network entity, wherein the wireless communication device is associated with controlling one or more UEs for the network entity.

Method 900 then proceeds to step 920 with communicating in accordance with the configuration.

In a first aspect, the communication state is based at least in part on an energy state of at least the wireless communication device.

In a second aspect, alone or in combination with the first aspect, the wireless communication device comprises at least one of a programmable logic controller (PLC), a primary UE, a controlling UE, or a controlling unit of a sidelink.

In a third aspect, alone or in combination with one or more of the first and second aspects, the communication state is based at least in part on a joint energy state of the network entity and the wireless communication device.

In a fourth aspect, alone or in combination with one or more of the first through third aspects, the configuration of the communication state is included in a resource pool configuration.

In a fifth aspect, alone or in combination with one or more of the first through fourth aspects, method 900 includes outputting the resource pool configuration to at least one of the wireless communication device or the one or more UEs.

In a sixth aspect, alone or in combination with one or more of the first through fifth aspects, method 900 includes communicating in accordance with the indication.

In a seventh aspect, alone or in combination with one or more of the first through sixth aspects, the configuration of the communication state indicates a semi-static pattern for the communication state.

In an eighth aspect, alone or in combination with one or more of the first through seventh aspects, the communication state includes a first energy state and is based at least in part on a second energy state of the network entity.

In a ninth aspect, alone or in combination with one or more of the first through eighth aspects, the first energy state is associated with scheduling of the one or more UEs and the second energy state is not associated with scheduling of the one or more UEs.

In a tenth aspect, alone or in combination with one or more of the first through ninth aspects, the communication state includes a first energy state, wherein at least one of the configuration or the first energy state indicates a communication configuration between the network entity and the wireless communication device, and wherein the communication configuration is based at least in part on a second energy state of the network entity.

In an eleventh aspect, alone or in combination with one or more of the first through tenth aspects, the communication configuration indicates at least one of a downlink control information monitoring occasion or a search space set group.

In a twelfth aspect, alone or in combination with one or more of the first through eleventh aspects, method 900 includes outputting, to the one or more UEs, a communication configuration associated with the communication state.

In a thirteenth aspect, alone or in combination with one or more of the first through twelfth aspects, the communication configuration indicates at least one of a transmit power of a UE of the one or more UEs, a relaying configuration for the UE, a number of receive antennas of the UE, a bandwidth part, or a resource allocation limit.

In a fourteenth aspect, alone or in combination with one or more of the first through thirteenth aspects, the communication configuration is based at least in part on a joint energy state of the network entity and the wireless communication device, wherein the communication state comprises the joint energy state.

In a fifteenth aspect, alone or in combination with one or more of the first through fourteenth aspects, the communication state is associated with at least one of a discontinuous reception configuration between the wireless communication device and a UE of the one or more UEs, a power control parameter of the wireless communication device, a channel state information configuration, a demodulation reference signal configuration, an expected duration between resource allocations, a configured grant configuration, a scheduling request configuration, or a buffer status report configuration.

In a sixteenth aspect, alone or in combination with one or more of the first through fifteenth aspects, the communication state is associated with at least one of a delta modulation and coding scheme value, a modulation and coding scheme table, a block error rate threshold, a service, or a logical channel group.

In a seventeenth aspect, alone or in combination with one or more of the first through sixteenth aspects, the communication state indicates whether a transmission cast type is enabled or disabled.

In an eighteenth aspect, alone or in combination with one or more of the first through seventeenth aspects, the communication state indicates whether a non-data sidelink service is enabled or disabled.

In a nineteenth aspect, alone or in combination with one or more of the first through eighteenth aspects, the communication state is associated with a maximum number of retransmissions.

In a twentieth aspect, alone or in combination with one or more of the first through nineteenth aspects, the communication state indicates the maximum number of retransmissions.

In a twenty-first aspect, alone or in combination with one or more of the first through twentieth aspects, method 900 includes outputting signaling indicating the maximum number of retransmissions.

Figure 11:
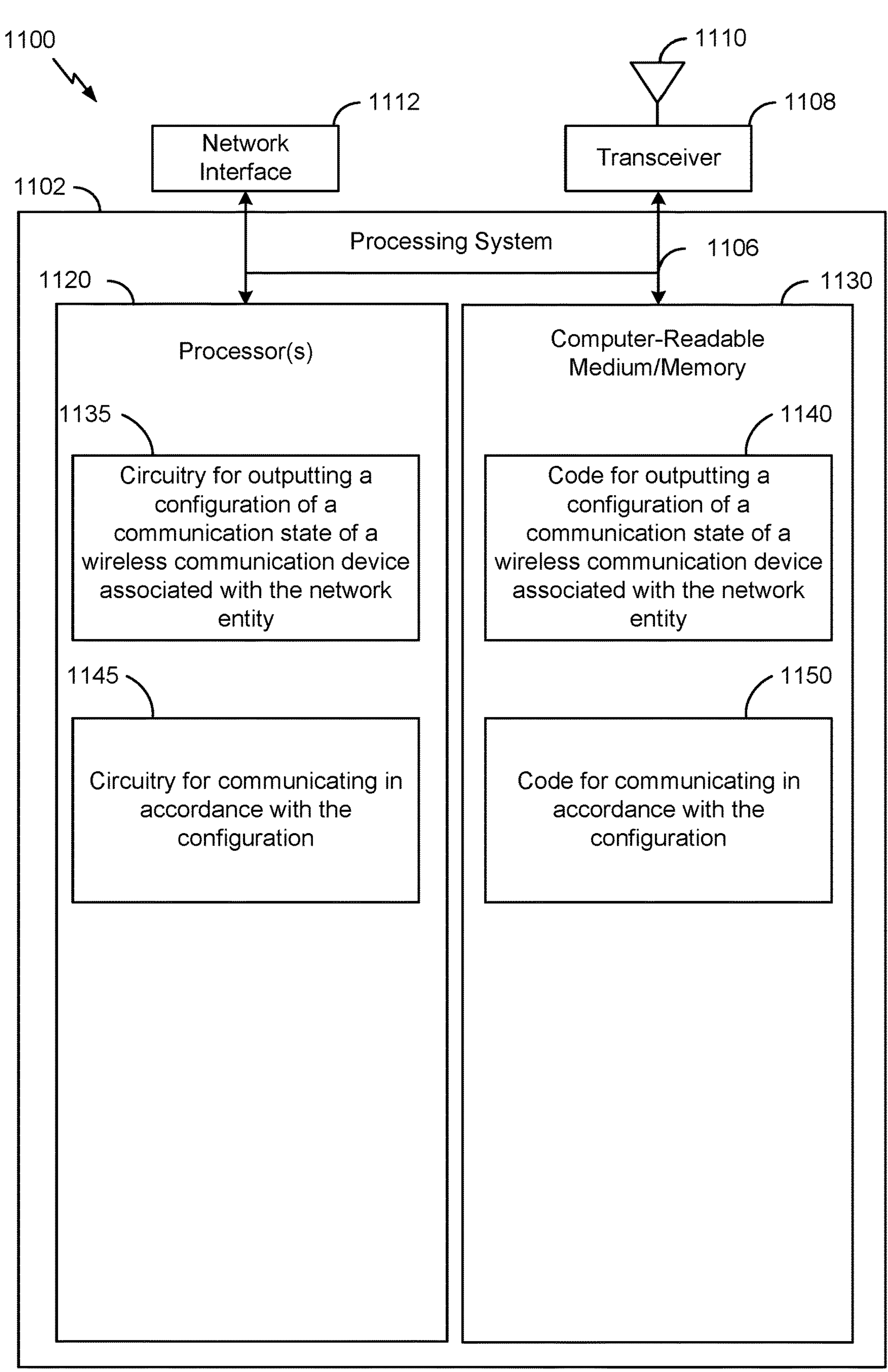
FIG. 11 is a diagram illustrating an example of an implementation of code and circuitry for a communications device, in accordance with the present disclosure.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that method 900 is just one example of a method, and other methods including fewer, additional, or alternative steps are possible consistent with this disclosure.

Figure 10:
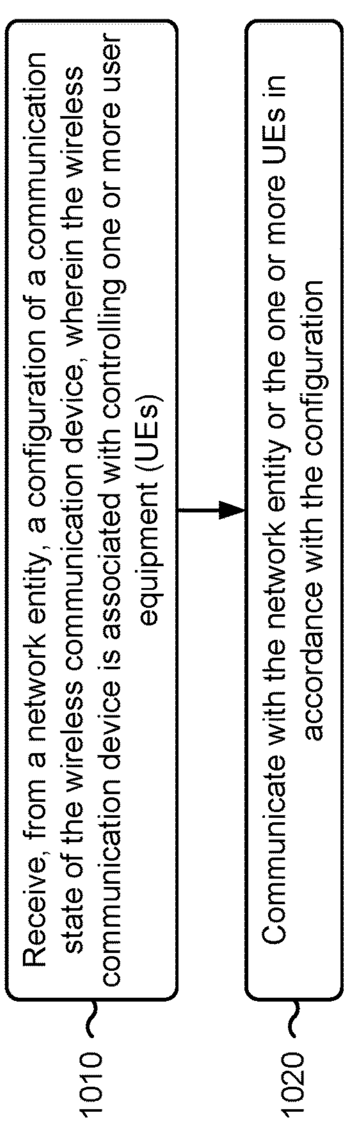
FIG. 10 shows a method for wireless communications by a wireless communication device.

FIG. 10 shows a method 1000 for wireless communications by a wireless communication device, such as UE 120 (e.g., a primary UE or a controlling UE), a PLC, a controlling unit of a sidelink deployment, or an element of a disaggregated base station as discussed with respect to FIG. 3.

Method 1000 begins at 1010 with receiving, from a network entity, a configuration of a communication state of the wireless communication device, wherein the wireless communication device is associated with controlling one or more UEs.

Method 1000 then proceeds to step 1020 with communicating with the network entity or the one or more UEs in accordance with the configuration.

In a first aspect, the communication state is associated with an energy state of at least the wireless communication device.

In a second aspect, alone or in combination with the first aspect, the wireless communication device comprises at least one of a PLC, a primary UE, a controlling UE, or a controlling unit of a sidelink.

In a third aspect, alone or in combination with one or more of the first and second aspects, the communication state is based at least in part on a joint energy state of the network entity and the wireless communication device.

In a fourth aspect, alone or in combination with one or more of the first through third aspects, the configuration of the communication state is included in a resource pool configuration.

In a fifth aspect, alone or in combination with one or more of the first through fourth aspects, method 1000 includes communicating in accordance with the indication.

In a sixth aspect, alone or in combination with one or more of the first through fifth aspects, the configuration of the communication state indicates a semi-static pattern for the communication state.

In a seventh aspect, alone or in combination with one or more of the first through sixth aspects, the communication state comprises a first energy state and is based at least in part on a second energy state of the network entity.

In an eighth aspect, alone or in combination with one or more of the first through seventh aspects, the first energy state is associated with scheduling of the one or more UEs and the second energy state is not associated with scheduling of the one or more UEs.

In a ninth aspect, alone or in combination with one or more of the first through eighth aspects, the communication state comprises a first energy state, wherein at least one of the configuration or the first energy state indicates a communication configuration between the network entity and the wireless communication device, and wherein the communication configuration is based at least in part on a second energy state of the network entity.

In a tenth aspect, alone or in combination with one or more of the first through ninth aspects, the communication configuration indicates at least one of a downlink control information monitoring occasion or a search space set group.

In an eleventh aspect, alone or in combination with one or more of the first through tenth aspects, method 1000 includes outputting, to the one or more UEs, a communication configuration associated with the communication state.

In a twelfth aspect, alone or in combination with one or more of the first through eleventh aspects, the communication configuration indicates at least one of a transmit power of a UE of the one or more UEs, a relaying configuration for the UE, a number of receive antennas of the UE, a bandwidth part, or a resource allocation limit.

In a thirteenth aspect, alone or in combination with one or more of the first through twelfth aspects, the communication configuration is based at least in part on a joint energy state of the network entity and the wireless communication device.

In a fourteenth aspect, alone or in combination with one or more of the first through thirteenth aspects, the communication state is associated with at least one of a discontinuous reception configuration between the wireless communication device and a UE of the one or more UEs, a power control parameter of the wireless communication device, a channel state information configuration, a demodulation reference signal configuration, an expected duration between resource allocations, a configured grant configuration, a scheduling request configuration, or a buffer status report configuration.

In a fifteenth aspect, alone or in combination with one or more of the first through fourteenth aspects, the communication state is associated with at least one of a delta modulation and coding scheme value, a modulation and coding scheme table, a block error rate threshold, a service, or a logical channel group.

In a sixteenth aspect, alone or in combination with one or more of the first through fifteenth aspects, the communication state indicates whether a transmission cast type is enabled or disabled.

In a seventeenth aspect, alone or in combination with one or more of the first through sixteenth aspects, the communication state indicates whether a non-data sidelink service is enabled or disabled.

In an eighteenth aspect, alone or in combination with one or more of the first through seventeenth aspects, the communication state is associated with a maximum number of retransmissions.

In a nineteenth aspect, alone or in combination with one or more of the first through eighteenth aspects, the communication state indicates the maximum number of retransmissions.

In a twentieth aspect, alone or in combination with one or more of the first through nineteenth aspects, method 1000 includes outputting signaling indicating the maximum number of retransmissions.

Figure 12:
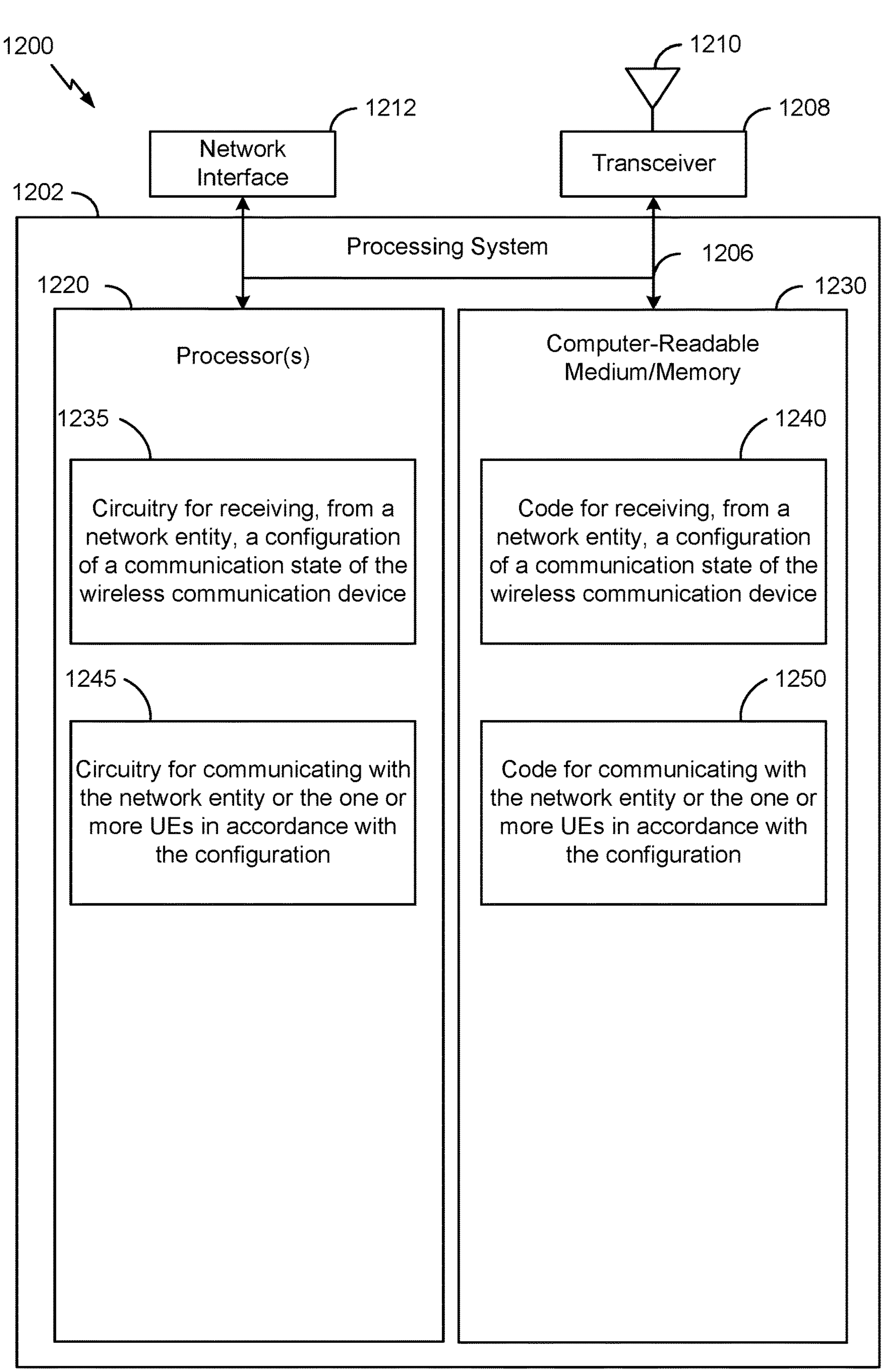
FIG. 12 is a diagram illustrating an example of an implementation of code and circuitry for a communications device, in accordance with the present disclosure.

In one aspect, method 1000, or any aspect related to it, may be performed by an apparatus, such as communications device 1200 of FIG. 12, which includes various components operable, configured, or adapted to perform the method 1000.

Communications device 1200 is described below in further detail.

Note that method 1000 is just one example of a method, and other methods including fewer, additional, or alternative steps are possible consistent with this disclosure.

FIG. 11 is a diagram illustrating an example of an implementation of code and circuitry for a communications device 1100, in accordance with the present disclosure. The communications device 1100 may be a network entity (such as BS 110 or a disaggregated base station as described with regard to FIG. 3), or a network entity may include the communications device 1100.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The network interface 1112 is configured to obtain and send signals for the communications device 1100 via communications link(s), such as a backhaul link, midhaul link, and/or fronthaul link as described herein, such as with respect to FIG. 3. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 238, transmit processor 220, TX MIMO processor 230, and/or controller/processor 240, as described with respect to FIG. 2. The one or more processors 1120 are coupled to a computer-readable medium/memory 1130 via a bus 1106. In various aspects, the computer-readable medium/memory 1130 may be representative of memory 242, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

As shown in FIG. 11, the communications device 1100 may include circuitry for outputting a configuration of a communication state of a wireless communication device associated with the network entity, wherein the wireless communication device is associated with controlling one or more UEs for the network entity (circuitry 1135).

As shown in FIG. 11, the communications device 1100 may include, stored in computer-readable medium/memory 1130, code for outputting a configuration of a communication state of a wireless communication device associated with the network entity, wherein the wireless communication device is associated with controlling one or more UEs for the network entity (code 1140).

As shown in FIG. 11, the communications device 1100 may include circuitry for communicating in accordance with the configuration (circuitry 1145).

As shown in FIG. 11, the communications device 1100 may include, stored in computer-readable medium/memory 1130, code for communicating in accordance with the configuration (code 1150).

Various components of the communications device 1100 may provide means for performing the method 900 described with respect to FIG. 9, or any aspect related to it. For example, means for transmitting, sending, or outputting for transmission may include the transceiver(s) 232 and/or antenna(s) 234 of the BS 110 and/or transceiver 1108 and antenna 1110 of the communications device 1100 in FIG. 11. Means for receiving or obtaining may include the transceiver(s) 232 and/or antenna(s) 234 of the BS 110 and/or transceiver 1108 and antenna 1110 of the communications device 1100 in FIG. 11.

FIG. 11 is provided as an example. Other examples may differ from what is described in connection with FIG. 11.

FIG. 12 is a diagram illustrating an example of an implementation of code and circuitry for a communications device 1200, in accordance with the present disclosure. The communications device 1200 may be a wireless communication device (such as UE 120 (e.g., a primary UE or a controlling UE), a PLC, a controlling unit of a sidelink deployment, or an element of a disaggregated base station as discussed with respect to FIG. 3), or a wireless communication device may include the communications device 1200.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 3. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 238, transmit processor 220, TX MIMO processor 230, and/or controller/processor 240, as described with respect to FIG. 2. The one or more processors 1220 are coupled to a computer-readable medium/memory 1230 via a bus 1206. In various aspects, the computer-readable medium/memory 1230 may be representative of memory 242, as described with respect to FIG. 2. In certain aspects, the computer-readable medium/memory 1230 is configured to store instructions (e.g., computer-executable code, processor-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

As shown in FIG. 12, the communications device 1200 may include circuitry for receiving, from a network entity, a configuration of a communication state of the wireless communication device, wherein the wireless communication device is associated with controlling one or more UEs (circuitry 1235).

As shown in FIG. 12, the communications device 1200 may include, stored in computer-readable medium/memory 1230, code for receiving, from a network entity, a configuration of a communication state of the wireless communication device, wherein the wireless communication device is associated with controlling one or more UEs (code 1240).

As shown in FIG. 12, the communications device 1200 may include circuitry for communicating with the network entity or the one or more UEs in accordance with the configuration (circuitry 1245).

As shown in FIG. 12, the communications device 1200 may include, stored in computer-readable medium/memory 1230, code for communicating with the network entity or the one or more UEs in accordance with the configuration (code 1250).

Various components of the communications device 1200 may provide means for performing the method 1000 described with respect to FIG. 10, or any aspect related to it. For example, means for transmitting, sending, or outputting for transmission may include the transceiver(s) 232 and/or antenna(s) 234 of the BS 110 and/or transceiver 1208 and antenna 1210 of the communications device 1200 in FIG. 12. Means for receiving or obtaining may include the transceiver(s) 232 and/or antenna(s) 234 of the BS 110 and/or transceiver 1208 and antenna 1210 of the communications device 1200 in FIG. 12.

FIG. 12 is provided as an example. Other examples may differ from what is described in connection with FIG. 12.

The following provides an overview of some Aspects of the present disclosure:

Aspect 1: A method of wireless communication performed by a network entity, comprising: outputting a configuration of a communication state of a wireless communication device associated with the network entity, wherein the wireless communication device is associated with controlling one or more user equipments (UEs) for the network entity; and communicating in accordance with the configuration.

Aspect 2: The method of Aspect 1, wherein the communication state is based at least in part on an energy state of at least the wireless communication device.

Aspect 3: The method of any of Aspects 1-2, wherein the wireless communication device comprises at least one of a programmable logic controller (PLC), a primary UE, a controlling UE, or a controlling unit of a sidelink.

Aspect 4: The method of any of Aspects 1-3, wherein the communication state is based at least in part on a joint energy state of the network entity and the wireless communication device.

Aspect 5: The method of any of Aspects 1-4, wherein the configuration of the communication state is included in a resource pool configuration.

Aspect 6: The method of Aspect 5, further comprising outputting the resource pool configuration to at least one of the wireless communication device or the one or more UEs.

Aspect 7: The method of any of Aspects 1-6, further comprising outputting an indication to activate the communication state, wherein communicating in accordance with the configuration further comprises communicating in accordance with the indication.

Aspect 8: The method of any of Aspects 1-7, wherein the configuration of the communication state indicates a semi-static pattern for the communication state.

Aspect 9: The method of any of Aspects 1-8, wherein the communication state includes a first energy state and is based at least in part on a second energy state of the network entity.

Aspect 10: The method of Aspect 9, wherein the first energy state is associated with scheduling of the one or more UEs and the second energy state is not associated with scheduling of the one or more UEs.

Aspect 11: The method of any of Aspects 1-10, wherein the communication state includes a first energy state, wherein at least one of the configuration or the first energy state indicates a communication configuration between the network entity and the wireless communication device, and wherein the communication configuration is based at least in part on a second energy state of the network entity.

Aspect 12: The method of Aspect 11, wherein the communication configuration indicates at least one of a downlink control information monitoring occasion or a search space set group.

Aspect 13: The method of any of Aspects 1-12, further comprising outputting, to the one or more UEs, a communication configuration associated with the communication state.

Aspect 14: The method of Aspect 13, wherein the communication configuration indicates at least one of: a transmit power of a UE of the one or more UEs, a relaying configuration for the UE, a number of receive antennas of the UE, a bandwidth part, or a resource allocation limit.

Aspect 15: The method of Aspect 13, wherein the communication configuration is based at least in part on a joint energy state of the network entity and the wireless communication device, wherein the communication state comprises the joint energy state.

Aspect 16: The method of any of Aspects 1-15, wherein the communication state is associated with at least one of: a discontinuous reception configuration between the wireless communication device and a UE of the one or more UEs, a power control parameter of the wireless communication device, a channel state information configuration, a demodulation reference signal configuration, an expected duration between resource allocations, a configured grant configuration, a scheduling request configuration, or a buffer status report configuration.

Aspect 17: The method of any of Aspects 1-16, wherein the communication state is associated with at least one of: a delta modulation and coding scheme value, a modulation and coding scheme table, a block error rate threshold, a service, or a logical channel group.

Aspect 18: The method of any of Aspects 1-17, wherein the communication state indicates whether a transmission cast type is enabled or disabled.

Aspect 19: The method of any of Aspects 1-18, wherein the communication state indicates whether a non-data sidelink service is enabled or disabled.

Aspect 20: The method of any of Aspects 1-19, wherein the communication state is associated with a maximum number of retransmissions.

Aspect 21: The method of Aspect 20, wherein the communication state indicates the maximum number of retransmissions.

Aspect 22: The method of Aspect 20, further comprising outputting signaling indicating the maximum number of retransmissions.

Aspect 23: A method of wireless communication performed by a wireless communication device, comprising: receiving, from a network entity, a configuration of a communication state of the wireless communication device, wherein the wireless communication device is associated with controlling one or more user equipments (UEs); and communicating with the network entity or the one or more UEs in accordance with the configuration.

Aspect 24: The method of Aspect 23, wherein the communication state is associated with an energy state of at least the wireless communication device.

Aspect 25: The method of any of Aspects 23-24, wherein the wireless communication device comprises at least one of a programmable logic controller (PLC), a primary UE, a controlling UE, or a controlling unit of a sidelink.

Aspect 26: The method of any of Aspects 23-25, wherein the communication state is based at least in part on a joint energy state of the network entity and the wireless communication device.

Aspect 27: The method of any of Aspects 23-26, wherein the configuration of the communication state is included in a resource pool configuration.

Aspect 28: The method of any of Aspects 23-27, further comprising receiving an indication to activate the communication state, wherein communicating in accordance with the configuration further comprises communicating in accordance with the indication.

Aspect 29: The method of any of Aspects 23-28, wherein the configuration of the communication state indicates a semi-static pattern for the communication state.

Aspect 30: The method of any of Aspects 23-29, wherein the communication state comprises a first energy state and is based at least in part on a second energy state of the network entity.

Aspect 31: The method of Aspect 30, wherein the first energy state is associated with scheduling of the one or more UEs and the second energy state is not associated with scheduling of the one or more UEs.

Aspect 32: The method of any of Aspects 23-31, wherein the communication state comprises a first energy state, wherein at least one of the configuration or the first energy state indicates a communication configuration between the network entity and the wireless communication device, and wherein the communication configuration is based at least in part on a second energy state of the network entity.

Aspect 33: The method of Aspect 32, wherein the communication configuration indicates at least one of a downlink control information monitoring occasion or a search space set group.

Aspect 34: The method of any of Aspects 23-33, further comprising outputting, to the one or more UEs, a communication configuration associated with the communication state.

Aspect 35: The method of Aspect 34, wherein the communication configuration indicates at least one of: a transmit power of a UE of the one or more UEs, a relaying configuration for the UE, a number of receive antennas of the UE, a bandwidth part, or a resource allocation limit.

Aspect 36: The method of Aspect 34, wherein the communication configuration is based at least in part on a joint energy state of the network entity and the wireless communication device.

Aspect 37: The method of any of Aspects 23-36, wherein the communication state is associated with at least one of: a discontinuous reception configuration between the wireless communication device and a UE of the one or more UEs, a power control parameter of the wireless communication device, a channel state information configuration, a demodulation reference signal configuration, an expected duration between resource allocations, a configured grant configuration, a scheduling request configuration, or a buffer status report configuration.

Aspect 38: The method of any of Aspects 23-37, wherein the communication state is associated with at least one of: a delta modulation and coding scheme value, a modulation and coding scheme table, a block error rate threshold, a service, or a logical channel group.

Aspect 39: The method of any of Aspects 23-38, wherein the communication state indicates whether a transmission cast type is enabled or disabled.

Aspect 40: The method of any of Aspects 23-39, wherein the communication state indicates whether a non-data sidelink service is enabled or disabled.

Aspect 41: The method of any of Aspects 23-40, wherein the communication state is associated with a maximum number of retransmissions.

Aspect 42: The method of Aspect 41, wherein the communication state indicates the maximum number of retransmissions.

Aspect 43: The method of Aspect 41, further comprising outputting signaling indicating the maximum number of retransmissions.

Aspect 44: An apparatus for wireless communication at a device, comprising a processor; memory coupled with the processor; and instructions stored in the memory and executable by the processor to cause the apparatus to perform the method of one or more of Aspects 1-43.

Aspect 45: A device for wireless communication, comprising a memory and one or more processors coupled to the memory, the one or more processors configured to perform the method of one or more of Aspects 1-43.

Aspect 46: An apparatus for wireless communication, comprising at least one means for performing the method of one or more of Aspects 1-43.

Aspect 47: A non-transitory computer-readable medium storing code for wireless communication, the code comprising instructions executable by a processor to perform the method of one or more of Aspects 1-43.

Aspect 48: A non-transitory computer-readable medium storing a set of instructions for wireless communication, the set of instructions comprising one or more instructions that, when executed by one or more processors of a device, cause the device to perform the method of one or more of Aspects 1-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a network entity, comprising:

outputting a configuration of a communication state of a wireless communication device associated with the network entity, wherein:

the communication state includes a first energy state of the wireless communication device that is based at least in part on a second energy state of the network entity, and the second energy state of the network entity is a network energy saving (NES) state that defines one or more operational parameters of at least the network entity, the wireless communication device is associated with controlling one or more user equipments (UEs) for the network entity, and the first energy state is associated with the wireless communication device scheduling of the one or more UEs while the network entity is in the NES state; and communicating in accordance with the configuration.

2. The method of claim 1, wherein the wireless communication device comprises at least one of a programmable logic controller (PLC), a primary UE, a controlling UE, or a controlling unit of a sidelink.

3. The method of claim 1, wherein the communication state is based at least in part on a joint energy state of the network entity and the wireless communication device.

4. The method of claim 1, wherein the configuration of the communication state is included in a resource pool configuration.

5. The method of claim 4, further comprising outputting the resource pool configuration to at least one of the wireless communication device or the one or more UEs.

6. The method of claim 1, further comprising outputting an indication to activate the communication state, wherein communicating in accordance with the configuration further comprises communicating in accordance with the indication.

7. The method of claim 1, wherein the configuration of the communication state indicates a semi-static pattern for the communication state.

8. The method of claim 1, wherein the second energy state is not associated with scheduling of the one or more UEs.

9. The method of claim 1, wherein:

at least one of the configuration or the first energy state indicates a communication configuration between the network entity and the wireless communication device, the communication configuration is based at least in part on the second energy state of the network entity, and the communication configuration indicates at least one of a downlink control information monitoring occasion or a search space set group.

10. The method of claim 1, further comprising outputting, to the one or more UEs, a communication configuration associated with the communication state.

11. The method of claim 10, wherein the communication configuration indicates at least one of:

a transmit power of a UE of the one or more UEs, a relaying configuration for the UE, a number of receive antennas of the UE, a bandwidth part, or a resource allocation limit.

12. The method of claim 10, wherein the communication configuration is based at least in part on a joint energy state of the network entity and the wireless communication device, wherein the communication state comprises the joint energy state.

13. The method of claim 1, wherein the communication state is associated with at least one of:

a discontinuous reception configuration between the wireless communication device and a UE of the one or more UEs, a power control parameter of the wireless communication device, a channel state information configuration, a demodulation reference signal configuration, an expected duration between resource allocations, a configured grant configuration, a scheduling request configuration, or a buffer status report configuration.

14. The method of claim 1, wherein the communication state is associated with at least one of:

a delta modulation and coding scheme value, a modulation and coding scheme table, a block error rate threshold, a service, or a logical channel group.

15. The method of claim 1, wherein the communication state indicates whether a transmission cast type is enabled or disabled.

16. The method of claim 1, wherein the communication state indicates whether a non-data sidelink service is enabled or disabled.

17. The method of claim 1, wherein the communication state is associated with a maximum number of retransmissions.

18. The method of claim 17, wherein the communication state indicates the maximum number of retransmissions.

19. The method of claim 17, further comprising outputting signaling indicating the maximum number of retransmissions.

20. A method of wireless communication performed by a wireless communication device, comprising:

receiving, from a network entity, a configuration of a communication state of the wireless communication device, wherein:

the communication state includes a first energy state of the wireless communication device that is based at least in part on a second energy state of the network entity, the second energy state of the network entity is a network energy saving (NES) state that defines one or more operational parameters of at least the network entity, the wireless communication device is associated with controlling one or more user equipments (UEs), and the first energy state is associated with the wireless communication device scheduling of the one or more UEs while the network entity is in the NES state; and communicating with the network entity or the one or more UEs in accordance with the configuration.

21. The method of claim 20, wherein the wireless communication device comprises at least one of a programmable logic controller (PLC), a primary UE, a controlling UE, or a controlling unit of a sidelink.

22. The method of claim 20, wherein the communication state is based at least in part on a joint energy state of the network entity and the wireless communication device.

23. The method of claim 20, wherein the configuration of the communication state is included in a resource pool configuration.

24. The method of claim 20, further comprising receiving an indication to activate the communication state, wherein communicating in accordance with the configuration further comprises communicating in accordance with the indication.

25. A network entity for wireless communication, comprising:

a memory; and one or more processors, coupled to the memory, configured to:

output a configuration of a communication state of a wireless communication device associated with the network entity, wherein:

the communication state includes a first energy state of the wireless communication device that is based at least in part on a second energy state of the network entity, the second energy state of the network entity is a network energy saving (NES) state that defines one or more operational parameters of at least the network entity, the wireless communication device is associated with controlling one or more user equipments (UEs) for the network entity, and the first energy state is associated with the wireless communication device scheduling of the one or more UEs while the network entity is in the NES state; and communicate in accordance with the configuration.

26. A wireless communication device for wireless communication, comprising:

a memory; and one or more processors, coupled to the memory, configured to:

receive, from a network entity, a configuration of a communication state of the wireless communication device, wherein:

the communication state includes a first energy state of the wireless communication device that is based at least in part on a second energy state of the network entity, the second energy state of the network entity is a network energy saving (NES) state that defines one or more operational parameters of at least the network entity, the wireless communication device is associated with controlling one or more user equipments (UEs), and the first energy state is associated with the wireless communication device scheduling of the one or more UEs while the network entity is in the NES state; and communicate with the network entity or the one or more UEs in accordance with the configuration.

27. The network entity of claim 25, wherein the communication state is based at least in part on a joint energy state of the network entity and the wireless communication device.

28. The wireless communication device of claim 26, wherein the communication state is based at least in part on a joint energy state of the network entity and the wireless communication device.

29. The wireless communication device of claim 26, wherein the configuration of the communication state is included in a resource pool configuration.

30. The wireless communication device of claim 26, wherein the one or more processors, coupled to the memory, are further configured to schedule the one or more UEs while the network entity is in the NES state in accordance with the configuration.

* * * * *